United States Patent [19]
Di Vita

[11] 4,288,143
[45] Sep. 8, 1981

[54] METHOD OF AND APPARATUS FOR SPLICING OPTICAL FIBERS

[75] Inventor: Pietro Di Vita, Turin, Italy

[73] Assignee: Cselt - Centro Studi e Laboratori Telecomunicazioni S.p.A., Turin, Italy

[21] Appl. No.: 107,658

[22] Filed: Dec. 27, 1979

[30] Foreign Application Priority Data

Dec. 28, 1978 [IT] Italy .................. 69977 A/78

[51] Int. Cl.³ ............................................ G02B 5/14
[52] U.S. Cl. .................. 350/96.21; 156/158; 350/96.22
[58] Field of Search ............. 350/96.15, 96.20, 96.21, 350/96.22, 96.24, 96.29, 320, 96.25; 156/158

[56] References Cited

U.S. PATENT DOCUMENTS

| | | | |
|---|---|---|---|
| 3,567,549 | 3/1971 | Hoffmeister et al. | 350/96.25 X |
| 4,049,414 | 9/1977 | Smith | 350/96.21 X |
| 4,062,620 | 12/1977 | Pirolli | 350/96.20 |
| 4,148,559 | 4/1979 | Gauthier | 350/96.21 |
| 4,196,965 | 4/1980 | Matsuno | 350/96.21 |

FOREIGN PATENT DOCUMENTS 54-10752  1/1979  Japan .................. 350/96.21

*Primary Examiner*—John K. Corbin
*Assistant Examiner*—John D. Lee
*Attorney, Agent, or Firm*—Karl F. Ross

[57] ABSTRACT

For the splicing of trunks of optical fibers, confronting trunk ends are closely juxtaposed in a surrounding enclosure which is subjected to vibrations transverse to its axis to generate an oscillating air column setting the trunk ends in vibration, the fiber trunks being clamped at points spaced from these ends by a distance sufficient to give rise to several standing-wave nodes at the applied frequency on the free fiber extremities. With these extremities vibrating in unison but at limited amplitudes compatible with the maximum permissible offset of the trunk axes, the confronting trunk ends are joined by the hardening of a blob of cement matching their refractive index, by electric fusion, or with the aid of a laser beam.

19 Claims, 8 Drawing Figures

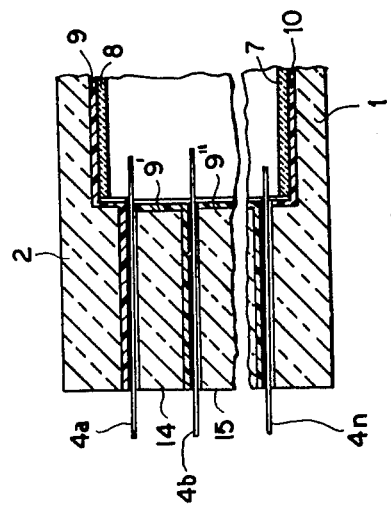
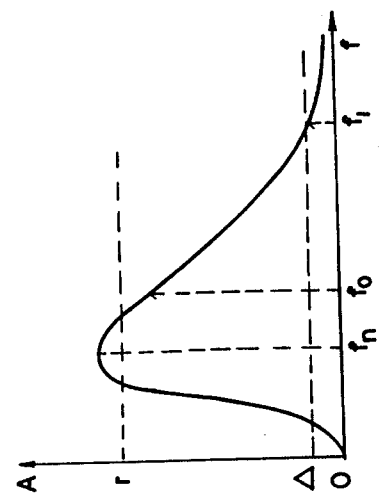
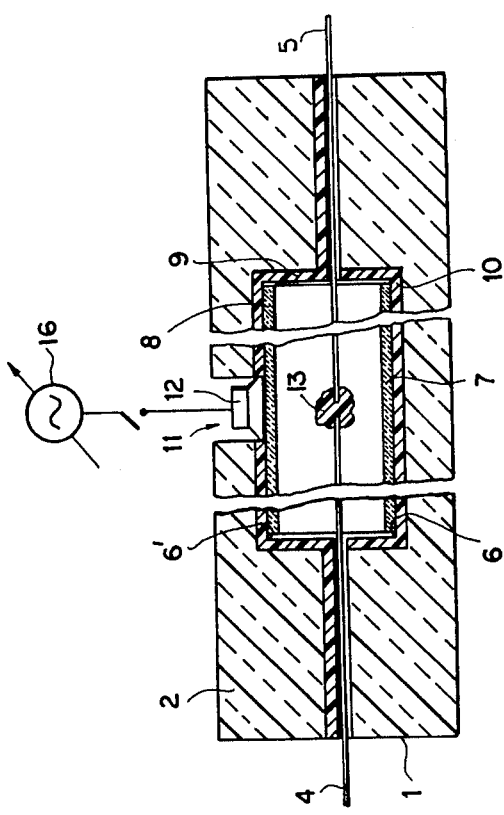
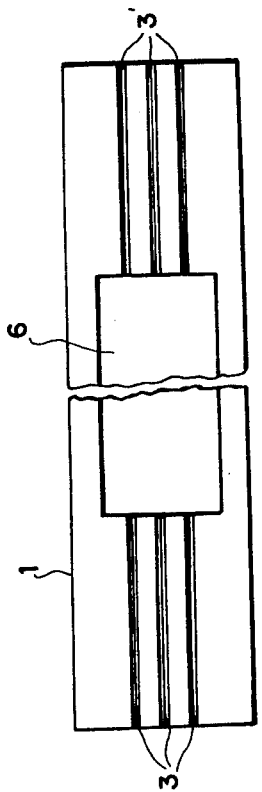
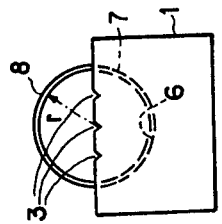

METHOD OF AND APPARATUS FOR SPLICING OPTICAL FIBERS

FIELD OF THE INVENTION

My present invention relates to a method of and an apparatus for splicing trunks of optical fibers designed for the transmission of luminous signals.

BACKGROUND OF THE INVENTION

The splicing of such fiber trunks requires alignment of their adjoining ends and with a minimum axial offset in order to avoid excessive losses of luminous energy at their junctions. When the fiber trunks are to be permanently interconnected, their ends may be bonded to each other with the aid of a transparent cement whose refractive index substantially matches that of the fibers. Thermal fusion may also be used for this purpose.

The alignment problem can be solved by the use of closely fitting sleeves or grooved guides in which the fiber extremities are permanently retained. The provision of such attachments, however, is cumbersome especially in the case of optical cables comprising a large number of fibers.

OBJECTS OF THE INVENTION

An object of my present invention, therefore, is to provide a method of splicing such fiber trunks with the requisite precision of alignment and without the need for permanent fittings.

A related object is to provide a simple apparatus for carrying out my new method.

SUMMARY OF THE INVENTION

In accordance with my present invention, a pair of fiber trunks to be spliced are axially aligned with their ends closely juxtaposed and are then clamped at points spaced from these ends, preferably by a distance exceeding the fiber diameter by about two orders of magnitude, whereby their unclamped extremities are free to vibrate transversely. These extremities are set in joint vibration of limited amplitude and at frequencies higher than their natural frequency, with formation of standing-wave nodes adjacent their juxtaposed ends. The actual splicing, by adhesive bonding or by thermal fusion as mentioned above, is then performed as the juxtaposed fiber ends vibrate in unison, at amplitudes compatible with the maximum permissible offset of the trunk axes.

According to another aspect of my invention, a stationary support is formed with at least one pair of aligned grooves for receiving the pair of fiber trunks to be spliced, with their ends juxtaposed in a recess between these grooves. With the fiber trunks retained in their grooves by a clamping force, a mobile enclosure spacedly surrounding the juxtaposed fiber ends in that recess is set in transverse vibration to produce an oscillating air column entraining the mobile fiber extremities for the purpose referred to. The clamping force may be supplied by a cover complementing the stationery support to form a housing in which the mobile enclosure is resiliently held. That enclosure, which may be a generally cylindrical or prismatic sleeve, is advantageously split longitudinally into two halves respectively lodged in the housing bottom and in the associated cover.

BRIEF DESCRIPTION OF THE DRAWING

The above and other features of my invention will now be described in detail with reference to the accompanying drawing in which:

FIG. 1 is a longitudinal sectional view of a splicing apparatus embodying my invention;

FIG. 2 is an end view of the apparatus of FIG. 1 with its cover removed;

FIG. 3 is a top view of the lower part of the apparatus;

FIG. 4 is a fragmentary sectional view similar to the left-hand end of FIG. 1 but showing a modified apparatus;

FIG. 8 is a graph relating to the operation of the apparatus.

SPECIFIC DESCRIPTION

Figure 5:
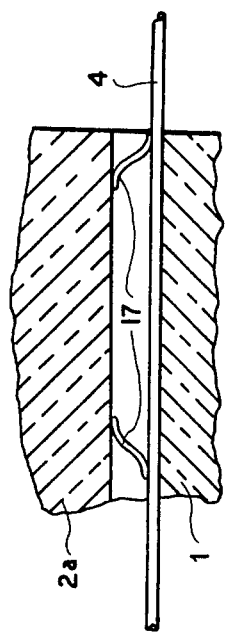
FIG. 5 is a sectional detail view illustrating another modification.

In FIGS. 1–3 I have shown a splicing apparatus comprising a bottom plate 1 and a cover plate 2, e.g. of transparent synthetic resin, forming part of a prismatic housing. Plate 1 is provided along its upper surface with several pairs of aligned, longitudinally extending grooves 3 and 3', which may be of triangular or trapezoidal cross-section, having an effective depth somewhat less than the thickness of fiber trunks 4 and 5 to be spliced. Grooves 3 and 3' terminate at a central recess 6 of semicylindrical shape which registers with a complementary recess 6' in cover plate 2 to form a cylindrical cavity whose axis parallels these grooves. A sleeve of slightly smaller diameter, consisting of two semicylindrical halves 7 and 8, is inserted into that cavity to form an enclosure spacedly surrounding the free extremities of fiber trunks 4 and 5 respectively lodged in grooves 3 and 3'. The lower sleeve half 7 is cushioned in recess 6 on a spongy layer 10 of foam rubber or plastic. A similar layer 9 lines the recess 6' and extends along the entire underside of cover plate 2 so as to bear upon the upper sleeve half 8 while also exerting an elastic clamping force on the portions of fiber trunks 4 and 5 lodged in grooves 3 and 3'. The insert 7, 8 is therefore free to vibrate transversely to its axis to an extent determined by the yieldability of cushioning layers 9 and 10.

Cover plate 2 has a central cutout 11 accommodating an electroacoustic transducer 12, such as a loudspeaker, which is connectable to an oscillator 16 of adjustable operating frequency in order to impart transverse vibrations to the sleeve 7, 8 and through it and the enclosed air column to the free extremities of fiber trunks 4 and 5. The confronting ends of these fiber trunks are closely juxtaposed in the middle of cavity 6, 6' and, as shown in FIG. 1, are bridged by a blob of transparent cement 13 whose refractive index matches that of the fibers. After such a blob 13 has been deposited on each pair of fiber ends to be bonded, vibrator 12 is actuated by oscillator 16 at a starting frequency $f_O$ higher than the natural frequency $f_n$ of the loose fiber extremities. The length of these extremities is preferably several hundred times the fiber diameter, i.e. a few centimeters when that diameter is about 0.1 millimeter.

Care should be taken to prevent the vibrating fiber ends from striking the surrounding sleeve 7,8. Thus, as shown in FIG. 8, the amplitude of vibration A at the fiber ends may exceed the radius r of sleeve 7, 8 at the natural frequency $f_n$ but will be less than that radius at the starting frequency $f_O$. If there are fiber trunks not only in the central grooves but also in the lateral grooves of FIG. 3, the ceiling will of course be lower than r. With sleeves of noncircular cross-section, radius r will have to be replaced by half the height of the sleeve in the plane of vibration (cf. FIG. 6). I also prefer to make the initial amplitude ($f_O$) less than half the transverse dimension of blob 13 if cement is used for the splicing.

As will be apparent from FIG. 8, amplitude A diminishes as the frequency ratio $f/f_n$ increases. By progressively increasing the operating frequency of oscillator 16 to a final value $f_1$, I am able to make that amplitude as small as desired. It should be noted that the presence of cement blob 13 on the fiber ends lowers the natural frequency $f_n$ at the outset, compared with the unloaded fiber extremity. As the cement hardens, frequency $f_n$ is further reduced with consequent rise in the ratio $f/f_n$ even if oscillator 16 is not adjusted. At the fiber ends, amplitude A should not exceed the maximum allowable offset $\Delta$ of the fiber-trunk axes before hardening sets in. Thus, with suitable choice of the final frequency $f_1$, the vibrations will produce standing waves with several nodes (one of them at the clamping point) along the trunk axis, one such node being located at or near the free end of the fiber extremity whereby the excursions of that end will be close to zero even if other parts oscillate at larger amplitudes. With $A \leq \Delta$ for both trunks, their confronting ends can be joined together within permissible tolerance limits even if the natural frequency is not exactly identical for the two extremities vibrating in unison.

As illustrated in FIG. 4, the fiber pairs to be spliced may be disposed in a three-dimensional array with the aid of a stack of grooved plates as shown in FIG. 4. Intermediate plates 14 and 15, overlying the bottom plate 1, have grooves similar to those shown at 3 and 3' in FIGS. 2 and 3 whereby several sets of coplanar fiber trunks 4a, 4b–4n (and corresponding sets at the nonillustrated other housing end) may be accommodated. Each of the overlying plates 14, 15 has a resilient layer 9', 9'' designed to exert the necessary clamping force upon the fibers of the next-lower plate. In this instance, of course, the permissible vibration amplitudes must take into account the distance of the lowest and highest fibers from the enclosure halves 7 and 8.

In FIG. 5 I have illustrated the possibility of replacing the retaining layers 9, 9', 9'' by resilient tongues 17 mounted in a channel of the overlying plate, here a top plate 2a.

Figure 6:
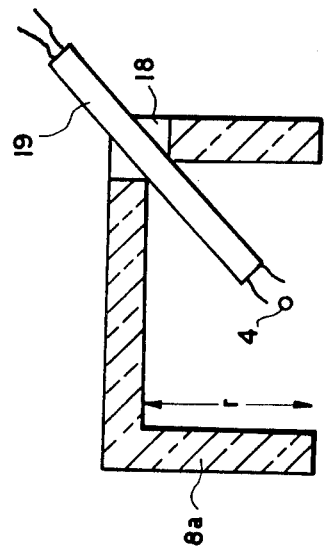
FIGS. 6 and 7 are cross-sectional detail views illustrating further variations.
Figure 7:
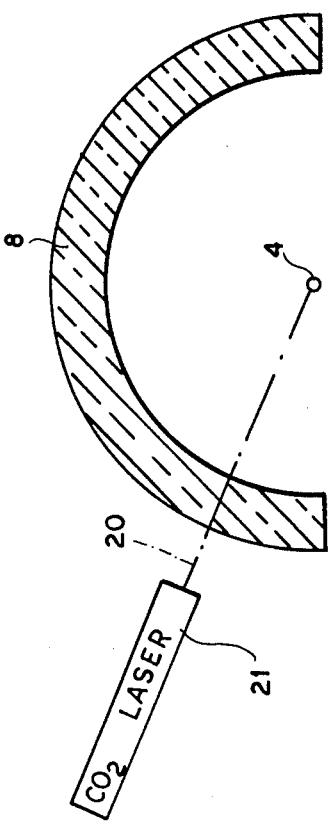

At least the upper half of the vibratory sleeve should be transparent to facilitate observation of the fiber ends (via cutout 11) during the splicing process. This is particularly important when splicing is carried out in a manner other than with the aid of a previously deposited cement blob. In FIG. 6, by way of example, I have shown a modified upper sleeve half 8a (here of prismatic rather than semicylindrical profile) provided with an aperture 18, aligned with the cutout 11 of FIG. 1, through which a tool 19 with electrodes for thermally fusing the confronted fiber ends can be inserted. FIG. 7 shows the transparent upper sleeve half 8 traversed by a beam 20 of a $CO_2$ laser 21 trained upon the pre-aligned fiber extremities. In these instances, of course, the fusion process will be initiated (by energizing the tool 19 or turning on the laser 21) only after the vibrating fiber extremities have developed standing-wave nodes in the vicinity of their confronting ends as discussed above.

The separable housing parts such as plates 1 and 2 may be held together during the splicing process by suitable locking means, e.g. magnetically.

I claim:

1. A method of splicing trunks of optical fibers, comprising the steps of:
   axially aligning a pair of fiber trunks to be spliced, with ends closely juxtaposed;
   clamping said fiber trunks at points spaced from their juxtaposed ends whereby said fiber trunks have unclamped extremities free to vibrate transversely;
   setting said extremities in joint vibration of limited amplitude and at frequencies higher than their natural frequency, with formation of standing-wave nodes adjacent their juxtaposed ends; and
   joining said juxtaposed ends together during their joint vibration.

2. A method as defined in claim 1 wherein said extremities have a length exceeding the fiber diameter by about two orders of magnitude.

3. A method as defined in claim 1 or 2 wherein said ends are joined by depositing thereon, prior to the onset of vibration, a blob of cement matching their refractive index and allowing said blob to harden.

4. A method as defined in claim 3 wherein the vibration amplitude is limited to less than half the transverse dimension of said blob.

5. A method as defined in claim 1 or 2 wherein said ends are joined by electric fusion.

6. A method as defined in claim 1 or 2 wherein said ends are joined by training a laser beam upon them.

7. A method as defined in claim 1 or 2 wherein vibration is imparted to said extremities by electroacoustically oscillating a surrounding body of air.

8. A method as defined in claim 1 or 2 wherein said extremities are being vibrated at an operating frequency whose magnitude relative to said natural frequency increases from a starting value to a final value with concomitant reduction in amplitude.

9. An apparatus for splicing trunks of optical fibers, comprising:
   stationary support means forming at least one pair of aligned grooves for receiving respective fiber trunks with ends closely juxtaposed in a recess between said grooves;
   retaining means coacting with said support means for exerting a clamping force upon said fiber trunks at locations spaced from their juxtaposed ends, thereby leaving unclamped extremities of said fiber trunks free to vibrate transversely in said recess;
   an enclosure in said recess spacedly surrounding said extremities with limited transverse mobility relative to said support means; and
   vibration-inducing means coupled with said enclosure for setting same together with a surrounded air column in transverse oscillation to vibrate said extremities at a frequency exceeding the natural frequency thereof, with formation of standing-wave nodes adjacent their juxtaposed ends to facilitate the joining of said ends to each other during said oscillation.

10. An apparatus as defined in claim 9 wherein said support means and said retaining means are part of a housing provided with cushioning means for yieldably holding said enclosure in position therein.

11. An apparatus as defined in claim 10 wherein said housing comprises a cover above said support means, said retaining means including resilient elements on the underside of said cover.

12. An apparatus as defined in claim 11 wherein said support means comprises a stack of plates including a bottom plate and at least one overlying plate each formed with a plurality of aligned grooves terminating at said recess, said retaining means further including resilient elements on the underside of said overlying plate.

13. An apparatus as defined in claim 11 or 12 wherein said resilient elements are layers of foam polymer.

14. An apparatus as defined in claim 11 or 12 wherein said resilient elements are elastic tongues.

15. An apparatus as defined in claim 11 or 12 wherein said enclosure is a sleeve longitudinally split into two halves respectively engaged by said support means and by said cover.

16. An apparatus as defined in claim 10, 11 or 12 wherein said housing is provided with an aperture accommodating said vibration-inducing means in contact with said enclosure.

17. An apparatus as defined in claim 16 wherein said vibration-inducing means comprises an electroacoustic transducer.

18. An apparatus as defined in claim 10, 11 or 12 wherein said housing and said enclosure are provided with access openings enabling insertion of a welding tool for fusing said ends to each other.

19. An apparatus as defined in claim 10, 11 or 12 wherein said enclosure is at least in part transparent for enabling a laser beam to be trained upon said ends to fuse same to each other.

* * * * *